United States Patent
Das et al.

(10) Patent No.: US 7,116,944 B2
(45) Date of Patent: *Oct. 3, 2006

(54) METHOD AND APPARATUS FOR FEEDBACK ERROR DETECTION IN A WIRELESS COMMUNICATIONS SYSTEMS

(75) Inventors: Arnab Das, Old Bridge, NJ (US); Farooq Ullah Khan, Manalapan, NJ (US); Ashwin Sampath, Somerset, NJ (US); Hsuan-Jung Su, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 557 days.

This patent is subject to a terminal disclaimer.

(21) Appl. No.: 10/351,914

(22) Filed: Jan. 27, 2003

(65) Prior Publication Data

US 2003/0148738 A1 Aug. 7, 2003

Related U.S. Application Data

(60) Provisional application No. 60/357,004, filed on Feb. 13, 2002, provisional application No. 60/335,471, filed on Feb. 7, 2002.

(51) Int. Cl.
*H04B 7/00* (2006.01)
*H04M 1/00* (2006.01)

(52) U.S. Cl. .................................. 455/69; 455/562.1
(58) Field of Classification Search .............. 455/69, 455/561, 562.1; 342/359, 360, 368
See application file for complete search history.

(56) References Cited

U.S. PATENT DOCUMENTS

| 5,628,052 | A  | * | 5/1997 | DeSantis et al. | ......... 455/562.1 |
| 6,192,256 | B1 | * | 2/2001 | Whinnett | .................. 455/562.1 |
| 6,205,127 | B1 |   | 3/2001 | Ramesh | ...................... 370/329 |
| 6,256,290 | B1 |   | 7/2001 | Ramesh | ...................... 370/204 |

(Continued)

OTHER PUBLICATIONS

Shigenori Uchida, et al., Closed-Loop Mode Phase Controlled Transmit Diversity for OFDM Using Difference Information of Phase Component Among Adjacent Subcarriers, IEICE Trans. Commun., vol. E85-B, No. 3 Mar. 2002.

(Continued)

*Primary Examiner*—Nguyen T. Vo

(57) ABSTRACT

Errors in closed loop transmit diversity (CLTD) feedback signaling may be detected and/or corrected by a mobile station, according to aspects of the present invention, based on signals received from a base station. The mobile station is generally configured to compute antenna weights to be applied at the base station and feed back corresponding antenna control bits to the base station, as in conventional CLTD systems. However, rather than automatically process subsequent transmissions received from the base station as if the base station properly received the antenna control bits and applied the computed antenna weights, the mobile station attempts to determine the antenna weights actually applied at the base station, and uses these determined antenna weights for processing the subsequent transmissions. Accordingly, even if a feedback signaling error occurred, resulting in the base station using the wrong antenna weights, the mobile station may properly process the transmissions. According to some aspects of the present invention, the base station transmits (feeds forward) antenna control bits actually received from the mobile station on a feed forward channel, and the mobile station processes subsequent transmissions using antenna weights generated based on the fed forward antenna control bits.

27 Claims, 12 Drawing Sheets

U.S. PATENT DOCUMENTS

| | | | |
|---|---|---|---|
| 6,304,750 B1 | 10/2001 | Rashid-Farrokhi et al. | 455/137 |
| 6,317,410 B1 | 11/2001 | Allpress et al. | 370/203 |
| 6,392,988 B1 | 5/2002 | Allpress et al. | 370/208 |
| 6,400,780 B1 | 6/2002 | Rashid-Farrokhi et al. | 375/347 |
| 6,421,327 B1 | 7/2002 | Lundby et al. | 370/310 |
| 6,490,270 B1 | 12/2002 | Krishnamoorthy et al. | 370/347 |
| 6,609,012 B1 * | 8/2003 | Malmgren et al. | 455/562.1 |
| 6,983,127 B1 | 1/2006 | Da Torre et al. | |
| 2002/0009061 A1 | 1/2002 | Willenegger | |
| 2002/0187753 A1 * | 12/2002 | Kim et al. | 455/69 |
| 2003/0148770 A1 * | 8/2003 | Das et al. | 455/455 |

OTHER PUBLICATIONS

ETSI TS 125 212 V5.1.0 (Jun. 2002), Technical Specification, Universal Mobile Telecommunications System (UMTS); Multiplexing and Channel Coding (FDD) (3GPP TS 25.212 version 5.1.0 Release 5).

3GPP TS 256.211 V5.0.0 (Mar. 2002), Technical Specification, $3^{rd}$ Generation Partnership Project; Technical Specification Group Radio Access Network; Physical Channels and Mapping of Transport Channels Onto Physical Channels (FDD) (Release 5).

3GPP TS 25.214 V5.0.0 (Mar. 2002), $3^{rd}$ Generation Partnership Project; Technical Specification Group Radio Access Network; Physical Layer Procedures (FDD) (Release 5).

* cited by examiner

METHOD AND APPARATUS FOR FEEDBACK ERROR DETECTION IN A WIRELESS COMMUNICATIONS SYSTEMS

CROSS-REFERENCE TO RELATED APPLICATIONS

This application claims the benefit of U.S. Provisional Application Ser. No. 60/355,471 filed on Feb. 7, 2002, and U.S. Provisional Application Ser. No. 60/357,004 filed on Feb. 13, 2002.

FIELD OF INVENTION

The present invention relates to wireless communications systems and, more particularly, to controlling transmissions from multiple base station antennas through closed loop transmit diversity (CLTD).

DESCRIPTION OF THE BACKGROUND ART

In prior art code division multiple access (CDMA) systems utilizing closed loop transmit diversity (CLTD), base stations having multiple antennas use an antenna weight coefficient vector to adjust the phase and/or relative amplitude of signals transmitted from each antenna. In such systems, a mobile station computes a set of optimized antenna weight coefficients that should be applied at the base station antennas to maximize the mobile received signal power. The mobile station then feeds back to the base station a set of antenna control bits for use by the base station in generating the optimized antenna weights.

However, one problem associated with CLTD schemes is that signaling errors on a feedback channel from the mobile station to the base station can lead to the use of the wrong antennas weights, which may have catastrophic results. For example, if a mobile station "blindly" processes (e.g., decode/demodulate) a transmission received from a base station on an assumption that the transmission was sent using antenna weights generated using the antenna control bits previously fed back to base station, feedback signaling errors may result in the mobile station demodulating/decoding the transmission using wrong antenna weights, which may lead to a very low demodulated signal-to-noise ratio, and a worthless, or invalid signal. This can lead to retransmissions, resulting in a reduction of bandwidth, and may even lead to data corruptions.

SUMMARY OF THE INVENTION

The disadvantages heretofore associated with the prior art, are overcome by the present invention of improved methods and apparatus for feedback error detections. A mobile station is generally configured to compute antenna weights to be applied at the base station and feed back corresponding antenna control bits to the base station, as in conventional CLTD systems. However, rather than automatically process subsequent transmissions received from the base station as if the base station properly received the antenna control bits and applied the computed antenna weights, the mobile station attempts to determine the antenna weights actually applied at the base station, and uses these determined antenna weights for processing the subsequent transmissions. Accordingly, even if a feedback signaling error occurred, resulting in the base station using the wrong antenna weights, the mobile station may properly process the transmissions. According to some aspects of the present invention, the base station transmits (feeds forward) antenna control bits actually received from the mobile station on a feed forward channel, and the mobile station processes subsequent transmissions using antenna weights generated based on the fed forward antenna control bits.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
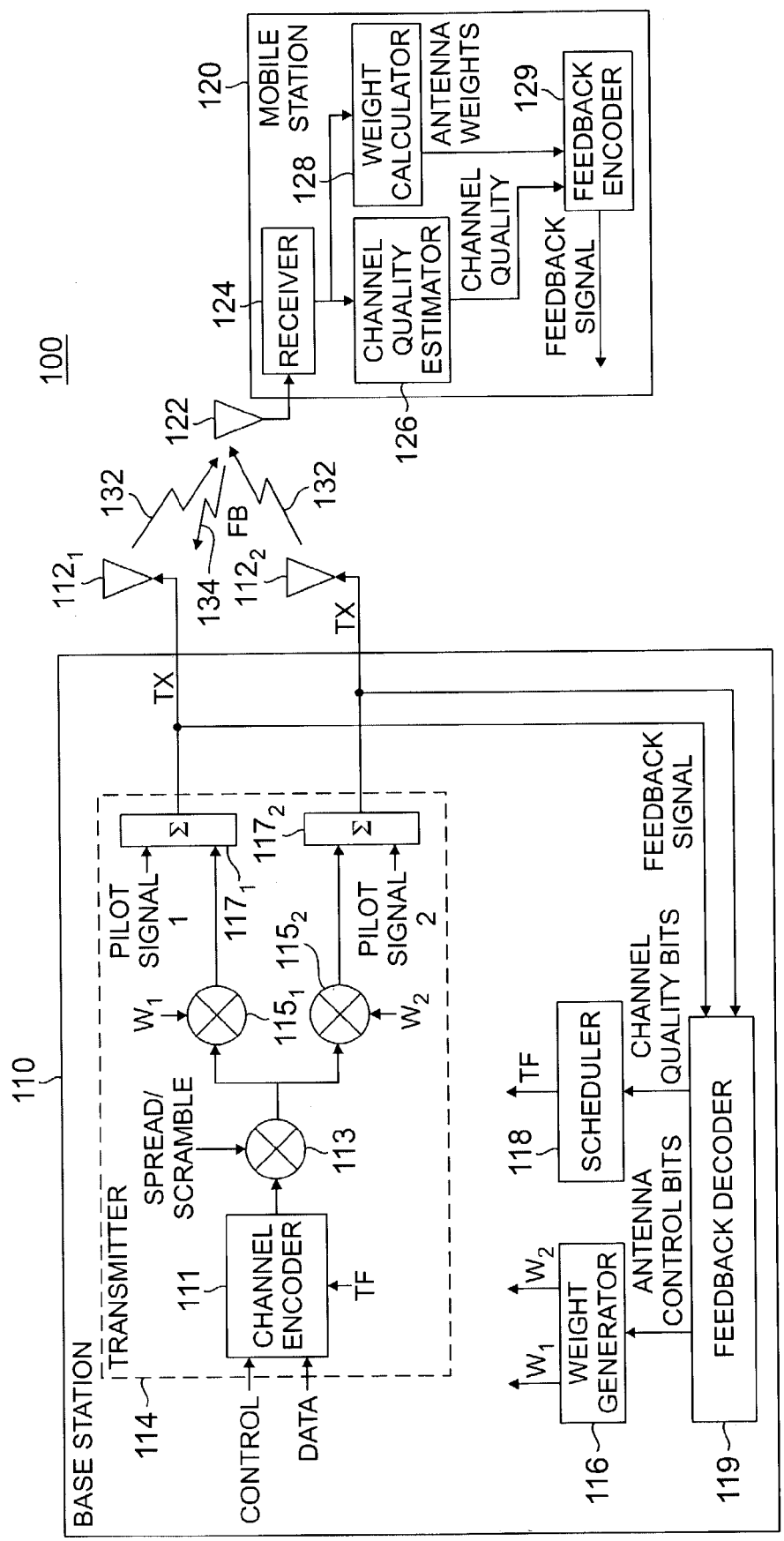
FIG. 1 shows an exemplary wireless communications system including a base station and mobile station in accordance with aspects of the present invention.

The present invention provides methods, apparatus, and systems for performing transmit diversity in a wireless communications system. According to some aspects of the present invention, encoded antenna control information may be transmitted (fed back) from a mobile station to a base station. The base station may decode the antenna control information and use the decoded antenna control information to generate a set of antenna weights calculated to optimize transmitted signal strength received by the mobile station. According to some aspects, the encoded antenna control information may be interleaved in a single feedback control channel with channel quality information. According to other aspects of the present invention, feedback errors may be detected and/or corrected at the mobile station.

As used herein, the term closed loop transmit diversity (CLTD) generally refers to any transmit diversity scheme where feedback from a mobile station is used to control (e.g., adjust phase and/or power of) antennas used for transmissions to the mobile station, and specifically includes selection transmit diversity (STD). As used herein, power control generally refers to the setting/adjusting of relative antenna transmit amplitudes. As used herein, a channel generally refers to a communication link established between a transmitting device and a receiving device. For example, in CDMA networks, communications channels are typically established by using an agreed-upon spreading code at the transmitting and receiving devices.

The following merely illustrates aspects of the present invention. It will thus be appreciated that those skilled in the art will be able to devise various arrangements which, although not explicitly described or shown herein, embody aspects of the present invention and are included within its spirit and scope. Furthermore, all examples and conditional language recited herein are principally intended expressly to aid the reader in understanding the aspects of the present invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, pseudocode, and the like represent various processes which may be substantially represented in computer readable medium and so executed by a computer or processor, whether or not such computer or processor is explicitly shown. Further, various functions of the various elements shown in the FIGs., may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

TRANSMIT DIVERSITY BASED ON ENCODED FEEDBACK

FIG. 1 illustrates the primary elements in a wireless communication system 100 employing transmit diversity in accordance with aspects of the present invention. As illustrated, the wireless communications system 100 includes a base station 110 in communication with a mobile station 120 via a forward (downlink) channel 132. Of course, while only a single base station 110 and mobile station 120 are shown, the wireless communications system 100 may include a plurality of each. According to some aspects of the present invention, the wireless communications system 100 may be capable of operating in accordance with any number of well known standards, such as the Universal Mobile Telecommunications System (UMTS) standard, the CDMA 2000 standard and their evolutions, which are hereby incorporated by reference in their entireties.

The base station 110 includes one or more antennas 112 (for illustrative purposes, two antennas $112_1$ and $112_2$, are shown) for transmitting signals on the forward channel 132. The antennas 112 receive signals from a transmitter portion 114 of the base station 110. As illustrated, the transmitter portion 114 may include conventional components, such as a channel encoder 111 to receive and encode signals to be transmitted, such as control and data signals. Encoded signals from the encoder 111 are received as input by a spreader multiplier 113, which multiplies the received signals by selected spreading codes. Copies of spread signals from the spreader multiplier 113 are received as input by weight multipliers $115_1$ and $115_2$ where the signals are multiplied by antenna weights $w_1$ and $w_2$ in order to adjust the phase and/or amplitude of the spread signals. The weighted signals from the weight multipliers $115_1$ and $115_2$ are combined with pilot signals by combiners $117_1$ and $117_2$. Each of the combined signals are then transmitted to the mobile station 120 via a respective one or the antennas $112_1$ and $112_2$.

Figure 2:
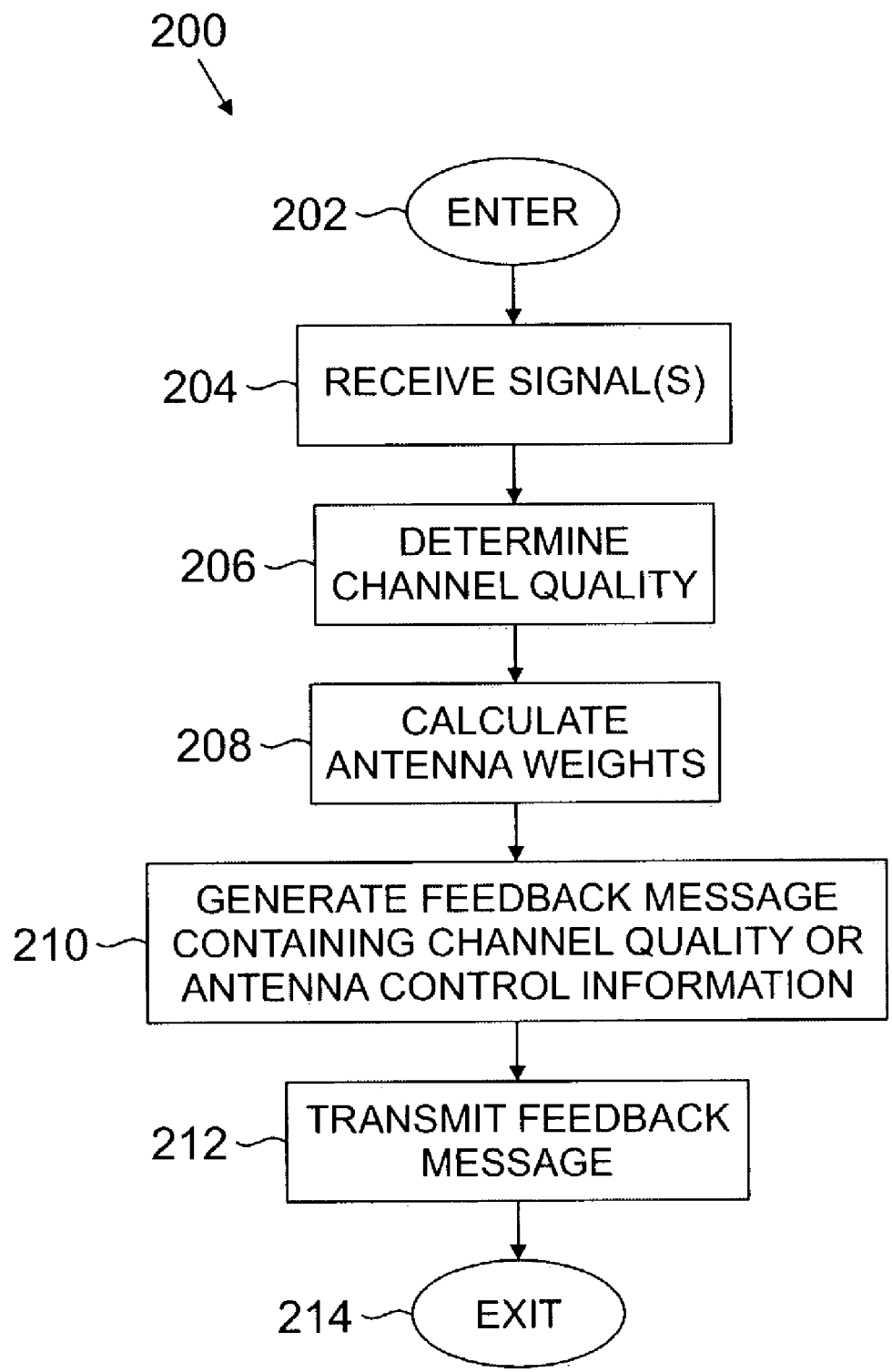
FIG. 2 shows a flow diagram of exemplary operations for antenna control that may be performed by the mobile station of FIG. 1.

As illustrated, the mobile station 120 generally includes one or more antenna 122 (one is shown), a receiver portion 124, channel quality estimator 126, weight calculator 128, and feedback encoder 129. Operations of the mobile station 120, and the illustrated components therein, may be best described concurrently with reference to FIG. 2, which illustrates exemplary operations 200 for controlling transmit diversity that may be performed at the mobile station 120, in accordance with the principles of the present invention. However, it should be noted that the illustrated components of the mobile station 120 of FIG. 1 are exemplary only and other elements may also be capable of performing the operations 200. Further, the elements shown in the mobile station 120 of FIG. 2 may also be capable of operations other than the exemplary operations 200.

The operations 200 begin at step 202, for example, when the base station 110 transmits a signal or signals to the mobile station 120. The operations 200 may be entered in step 202 with every transmission (e.g., within a time slot) from the base station 110, or periodically, for example, every N time slots, where N may correspond to a transmission time interval (TTI) or may be otherwise predetermined, for example, depending on how often feedback is desired. Regardless, at step 204, the mobile station 120 receives signals transmitted from the base station antennas 112 via antenna 122, which may be fed to the receiver 124, which may process (e.g., demodulate, decode, etc.) the signals using well known techniques.

At step 206, the mobile station 120 determines the channel quality based on the received signals. For example, the received signals may be fed from the receiver 124 to the channel quality estimator 126 to determine channel quality. The channel quality estimator 126 may calculate a channel quality information using well known measures, such as signal to noise ratio (SNR) and signal to interference and noise ratio (SINR).

At step 208, the mobile station 120 calculates antenna weights to be applied at the base station, based on the received signals. For example, the received signals may be fed from the receiver 124 to the antenna weight calculator 128 to calculate the antenna weights. The antenna weights may be a matrix of complex valued signals. As previously described, the antenna weights (e.g., w1 and w2) are generally calculated in an effort to maximize the strength of the signals received at the mobile station 120, and may be calculated using well known techniques.

However, in accordance with aspects of the present invention, and in contrast to the prior art, rather than attempt to maximize the strength of signals received from more than one base station (e.g., in a soft handoff situation) the antenna weights may be calculated to maximize the received signal strength from only a primary base station 110. However, channels used in HSDPA applications are not subject to soft handoff, and the HSDPA channels are only supported by a primary base station. Therefore, by calculating antenna weights in an effort to maximize the received signal strength from only the primary base station, degradation of signal strength (received from the primary base station) due to calculating the antenna weights to maximize received signal strength from other base stations (not supporting the data channels) may be avoided.

At step 210, the mobile station 120 generates a feedback message containing channel quality information (CQI) or antenna control information (ACI). For example, the feedback encoder 129 may be generally configured to receive channel quality output from the channel quality estimator and antenna weights from the antenna weight calculator and generate the feedback message with the CQI or ACI.

For example, to conserve bandwidth and reduce feedback delays, rather than feed back the entire matrix of antenna weights, the mobile station 120 may feed back a set of antenna control information (ACI) bits generated by the feedback encoder based on the antenna weights (for example through simple quantization of the weight values). The ACI bits are generally designed to provide sufficient information for the base station 110 to generate the antenna weights calculated by the mobile station weight calculator 128. For example (as with CLTD modes supported in UMTS), the ACI bits may include a certain number of bits for phase control, and a certain number of bits for power control (i.e., setting of the relative antenna transmit amplitudes). The number of bits may vary with different implementations and may be determined, for example, based on a desired resolution of phase and/or amplitude control. For example, the ACI bits may include 3 bits for phase control and 2 bits for amplitude control, providing for 8 different phase control settings and 4 different amplitude settings, respectively.

Of course, while a greater number of bits generally provides a greater resolution, the number of feedback bits may be subject to the law of diminishing return. In other words, additional feedback bits may require a feedback message to be transmitted over additional time slots, increasing the feedback delay, which may outweigh a marginal increase in performance. Further, in selection transmit diversity only one of a plurality of antennas is chosen for transmission. Accordingly, the antenna control information may simply provide an indication of the selected antenna (e.g., one of $2^N$ antennas may be selected with N ACI bits).

Regardless of the exact format and type of the ACI, however, in accordance with aspects of the present invention, and in contrast to the prior art, ACI may be sent in the feedback message as a set of encoded bits over one or more time slots, with multiple feedback bits per slot. Thus, the feedback message containing the ACI may include redundancy and may, therefore, be transmitted at lower power than conventional CLTD antenna control information.

In further contrast with the prior art, for some embodiments of the present invention, the same feedback channel 134 may be used to feedback both ACI and CQI. As will be discussed in greater detail below, if a common feedback channel is used, for a given set of time slots used for transmitting the feedback message, whether the feedback message contains CQI or ACI may be determined by a variety of algorithms.

At step 212, the mobile station 120 transmits the feedback message to the base station 110 and, at step 214, the operations 200 are terminated, for example, prior to repeating the operations 200 for a subsequent transmission. (Of course, while not shown, the mobile station 120 also includes a transmitter, which may include any combination of well known components.) The base station 110 may receive the feedback message and process the feedback message to extract the feedback information (ACI or CQI) to be used to control future transmissions to the mobile station 120.

Figure 3:
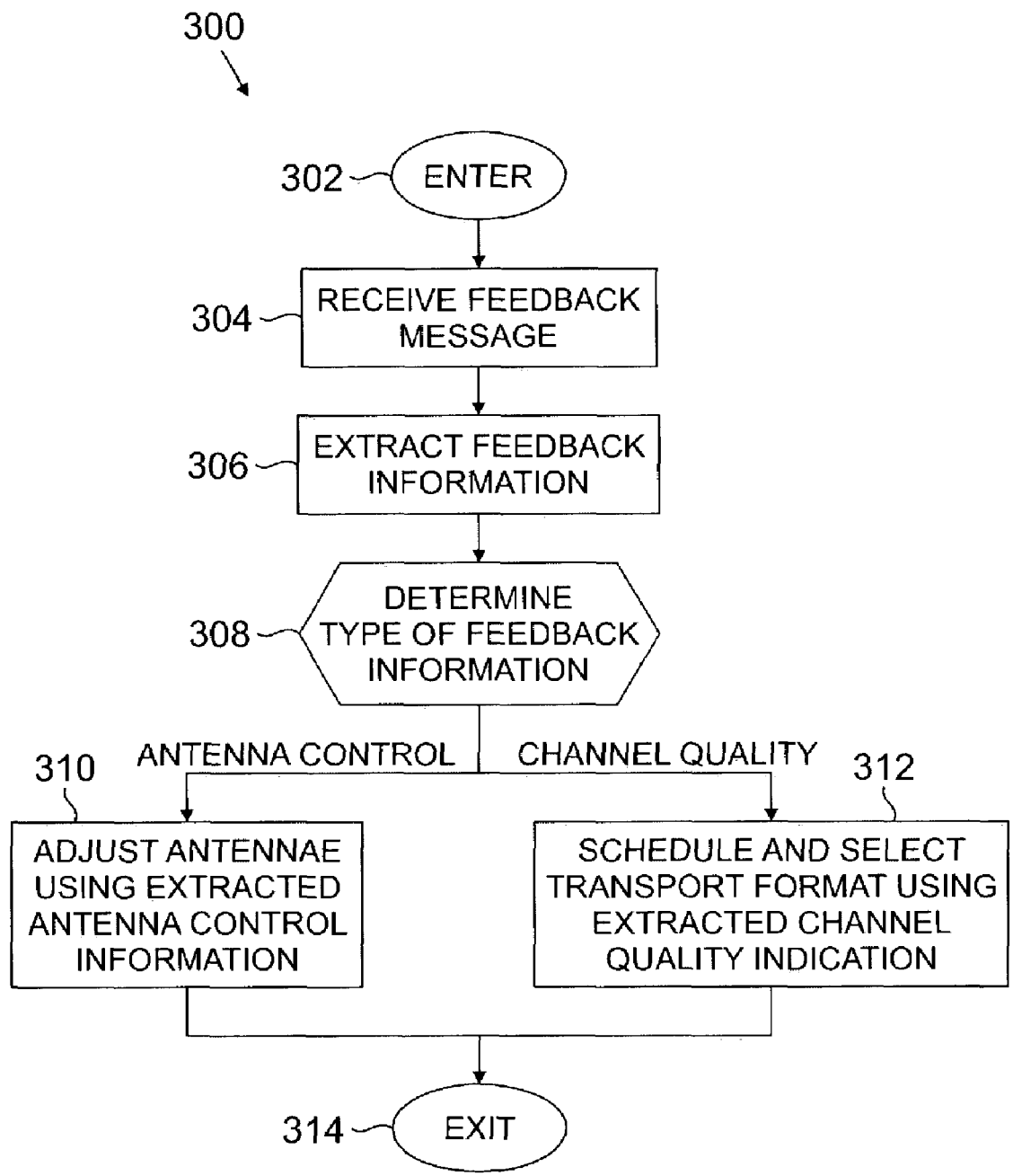
FIG. 3 shows a flow diagram of exemplary operations for antenna control that may be performed by the base station of FIG. 1.

For example, the base station 110 may receive and process the feedback message according to exemplary operations 300, illustrated in FIG. 3. The operations 300 begin at step 302, for example, after the base station 110 has transmitted a signal to the mobile station 120 and is waiting to receive a feedback message.

At step 304, the base station 110 receives the feedback message and, at step 306, extracts the feedback information from the feedback message. For example, the feedback signal containing the feedback message may be fed to a feedback decoder 119 generally configured to decode the feedback message and extract the feedback information.

At step 308, the base station 110 determines whether the feedback information (FBI) contains channel quality information (CQI) or antenna control information (ACI), which may also be performed by the feedback decoder 119. Determination of whether the FBI contains CQI or ACI may depend on the format of the FBI. For some embodiments, the CQI and ACI may be transmitted using a same number of encoded bits. In fact, the CQI and ACI may be transmitted in the same FBI field (e.g., transmitted in an agreed upon set of time slots) of the feedback channel 134. Therefore, the CQI and ACI may each be allocated a certain number of the possible values of the FBI bit field.

For example, if the FBI field includes a total number of 6 bits, there are 64 possible values, which may be allocated between ACI and CQI as desired. As illustrated in TABLE I below, 32 of the 6-bit FBI values (e.g., 000000–011111) may be allocated to ACI and 32 values (e.g., 100000–111111) for CQI, in which case a most significant bit (MSB) may be tested to determine if the FBI field contains ACI or CQI.

TABLE I

FBI FORMAT EXAMPLE (CLTD)

| 6-bit FBI | Signaling |
|---|---|
| 000000 | 32 levels for channel quality information (CQI) |
| 000001 | |
| ... | |
| 011111 | |
| 100000 | 32 levels for antenna control information (ACI) |
| 110001 | |
| ... | |
| 111111 | |

As an alternative, any other type of allocation may also be used (e.g., 48 values for CQI and 16 values may for ACI). The specific allocation of FBI values to ACI and CQI may be determined by an implementer, for example, based on system requirements and capabilities.

For some embodiments, selection transmit diversity may be employed where one of the two antennas is selected for transmission at any given time. The mobile station 120 may select an antenna for transmission based on pilot signals received from the two antennas. Therefore, the ACI may simply contain information indicating the selected antenna. Accordingly, the possible FBI values may be allocated between the CQI and antenna selection. As illustrated in TABLE II, a single bit

TABLE II

FBI FORMAT EXAMPLE (STD)

| 6-bit FBI | Signaling |
|---|---|
| 000000 | 62 levels for channel quality information (CQI) |
| 000001 | |
| ... | |
| 111101 | |
| 111110 | 2 levels for antenna selection |
| 111111 | | is sufficient to indicate the selected antenna (e.g., a 0 in the LSB may indicate selection of antenna 1, while a 1 in the LSB may indicate antenna 2). Accordingly, the FBI may be compared against a threshold value corresponding to the maximum value of CQI (or ACI) to determine if the FBI contains CQI or ACI.

Regardless of the particular format, if the FBI contains ACI, operations proceed to step 310, where the antennas are adjusted using the extracted antenna control information. For example, the base station may include an antenna weight generator 116 configured to generate a set of antenna weights (e.g., weight vectors w1 and w2), based on the extracted ACI bits. As illustrated, the generated antenna weights may be applied at the weight multipliers 115 for future transmissions from the antennas 112.

Alternately, if the FBI contains CQI, operations proceed to step 312, to schedule and select transport format (TF) of future transmissions using the extracted channel quality information. Transport format selection may include various signaling decisions made based on the channel quality, such as a number of data bits and redundant bits to encode in each data transmission time slot. At step 314, the operations 300 are terminated.

Figure 4:
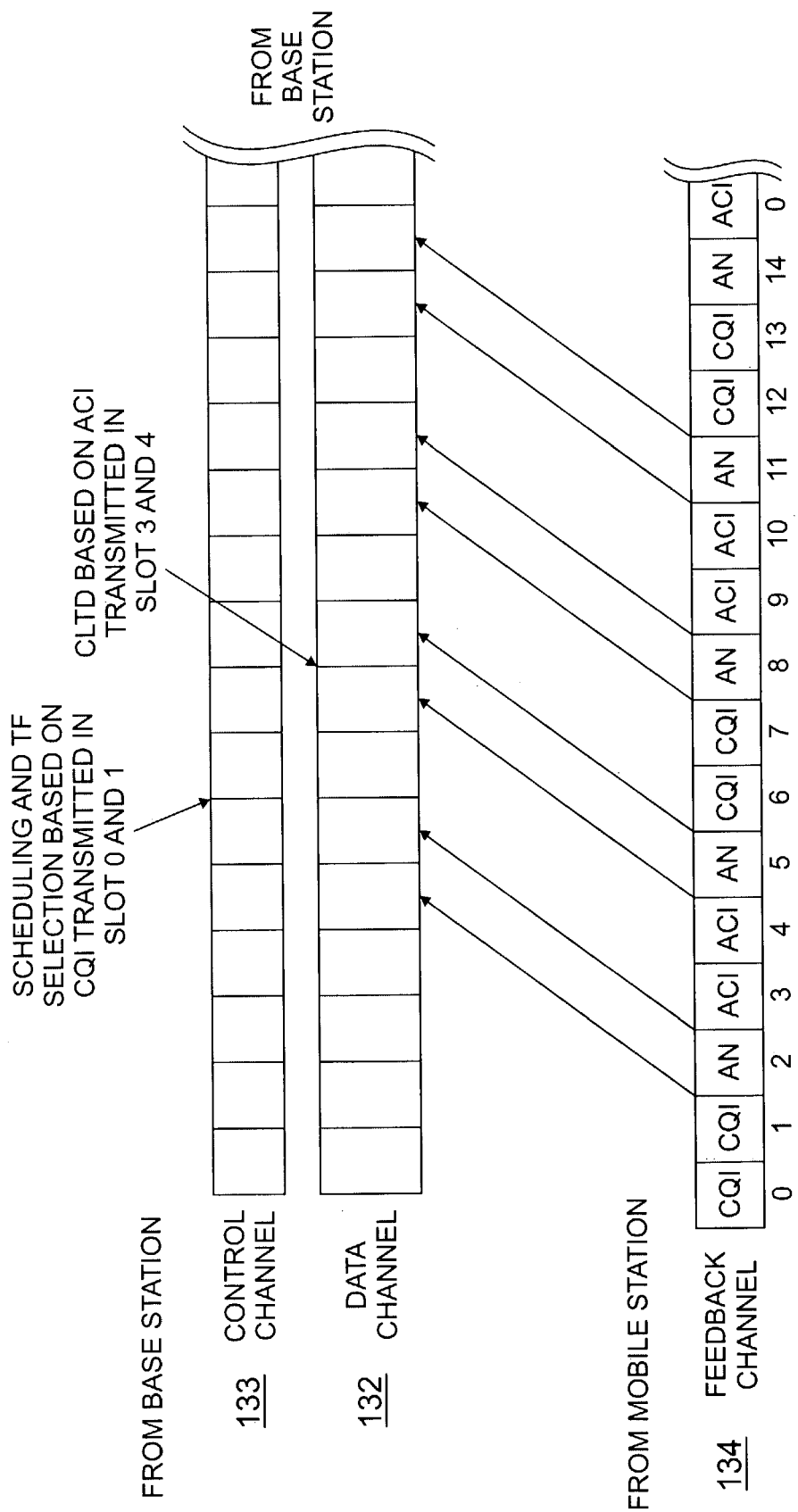
FIG. 4 shows an exemplary data exchange session in accordance with aspects of the present invention.

Of course, the operations 200 and 300 may be repeated by the mobile station 120 and base station 110, respectively, to continuously adjust transmissions from the base station 110 during an exchange of data (or data session). For example, FIG. 4 illustrates a flow of traffic for an exemplary data session, in accordance with aspects of the present invention. As illustrated, feedback messages containing channel quality information (CQI) and antenna control information (ACI) may be interleaved in the feedback channel 134. For example, CQI may be transmitted in slots 0 and 1 (slots 6 and 7, etc.), while ACI is transmitted in slots 3 and 4 (slots 9 and 10, etc.).

The feedback channel 134 may be an existing channel (e.g., defined by one of the previously referenced standard), such as a control channel used for uplink (UL) signaling. An example of such a control channel is the high speed dedicated physical control channel (HS-DPCCH) defined for use in HSDPA. The HS-DPCCH is presently used for HSDPA related UL signaling such as ACK/NACK (AN) feedback and CQI. In accordance with HSDPA, the mobile station 120 may be required to acknowledge receipt of data packets from the base station 110. Therefore, ACK/NACK (AN) signaling may also be interleaved in the feedback channel 134. As illustrated, according to HSDPA, a data packet is transmitted in a transmission time interval (TTI) of three time slots. Of course, the actual TTI length may vary with different (e.g., non HSDPA) implementations of the present invention.

As illustrated, the feedback bits (for either CQI or ACI) may be transmitted every TTI (e.g., for 6 bits of FBI, 3 bits may be transmitted per slot for 2 slots of a 3-slot TTI). Thus, the base station 110 may make adjustments based on the received feedback, prior to the transmitting the next data packet in the following TTI. For example, ACI transmitted in slots 3 and 4 (TTI 2) may be used by the base station 110 to adjust antennas 112 for data transmitted in slots 6–8 (TTI 3). Similarly, CQI transmitted in slots 0 and 1 (TTI 1) may be used for scheduling and transport format (TF) selection for transmissions in slots 3–5 (TTI 2). This corresponds to a feedback cycle of 2 TTI (or 6 time slots). In other words, the mobile station may expect to see transmissions adjusted based on the feedback 2 TTI after providing the feedback.

The decision about whether to send CQI or ACI in a particular TTI may be made according to any suitable scheduling scheme. For example, CQI and ACI may each be sent periodically (for example, every other TTI as illustrated in FIG. 4). As an alternative, the decision about sending CQI or ACI may be made dynamically based on a relative change of CQI and/or ACI compared to the previous update. Factors that may affect estimated channel quality and calculated antenna weights include a changing distance between the mobile station and base station (e.g., the speed of the mobile station), interference, and the like.

Figure 5:
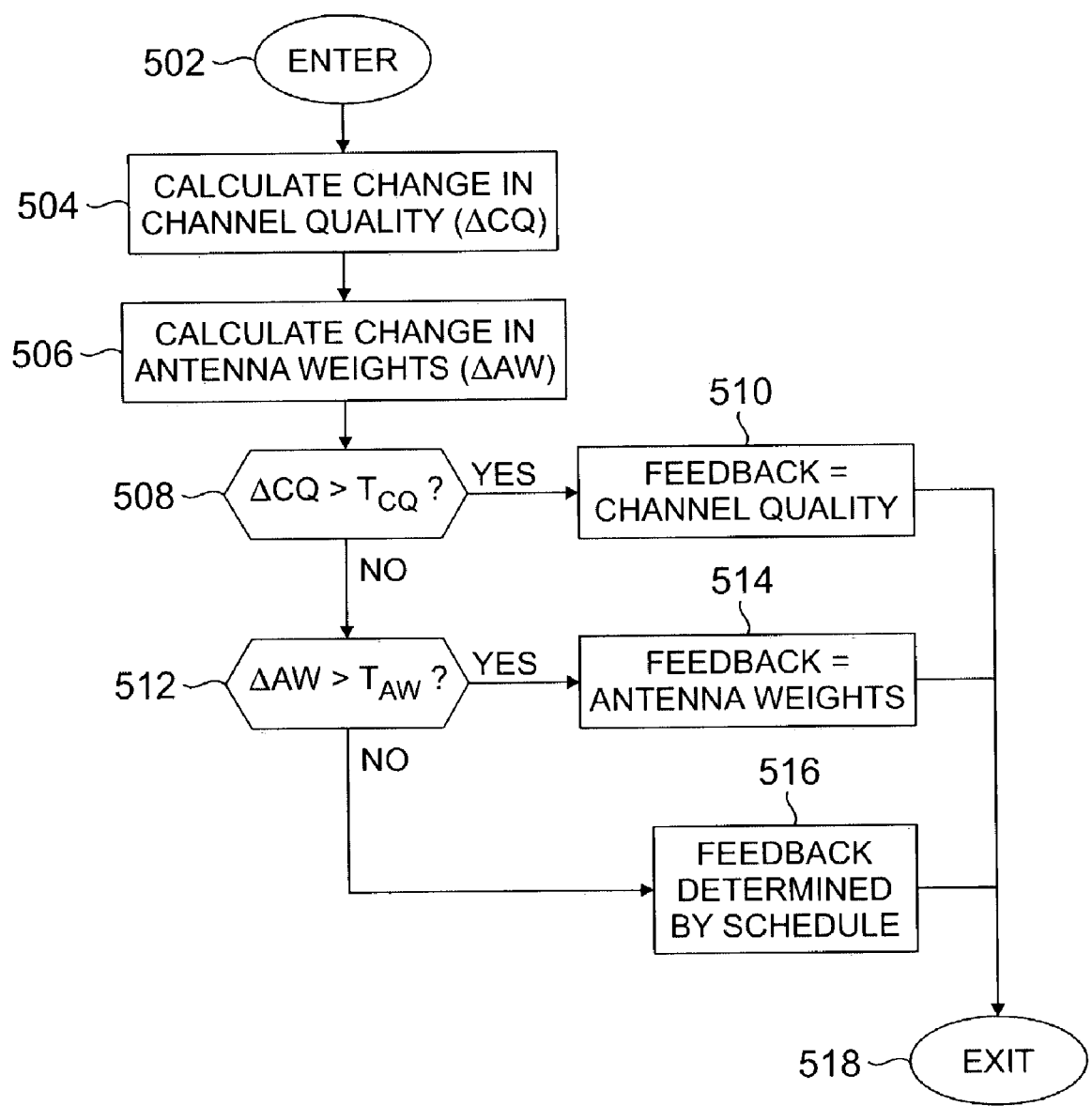
FIG. 5 shows a flow diagram of exemplary operations for providing feedback information that may be performed by the mobile station of FIG. 1.

FIG. 5 illustrates exemplary operations 500 for dynamically determining whether to send CQI or ACI. The operations 500 begin at 502, for example, after estimating channel quality and calculating antenna weights (e.g., steps 206 and 208 of FIG. 2). At step 504, the mobile station calculates a change in channel quality ($\Delta CQ$). At step 506, the mobile station calculates a change in antenna weights ($\Delta AW$).

For example, the changes in channel quality may be calculated by simply comparing the current estimated channel quality to the previous estimated channel quality. As an alternative, the change in channel quality may be calculated based on the current estimated channel quality and the estimated channel quality of a number of previous time slots. Similar techniques may be applied to calculate the change in antenna weights over one or more time slots.

At step 508, the mobile station 120 determines if the calculated change in channel quality exceeds a threshold value ($T_{CQ}$). If so, a feedback message is generated containing CQI, at step 510. If the calculated change in channel quality does not exceed $T_{CQ}$, the mobile station 120 determines if the calculated change in antenna weights exceeds a threshold value ($T_{AW}$), at step 512. If so, a feedback message is generated containing ACI, at step 514.

At step 516, if neither the change in channel quality nor the change in antenna weights exceeds their corresponding threshold levels, a feedback message containing either ACI or CQI, as determined by a default schedule, may be generated. For example, the default schedule may be designed to ensure that both CQI and ACI are fed back occasionally (for example, every 10 ms). At step 518, the operations 500 are terminated, for example, and the generated feedback message may be transmitted.

Figure 6:
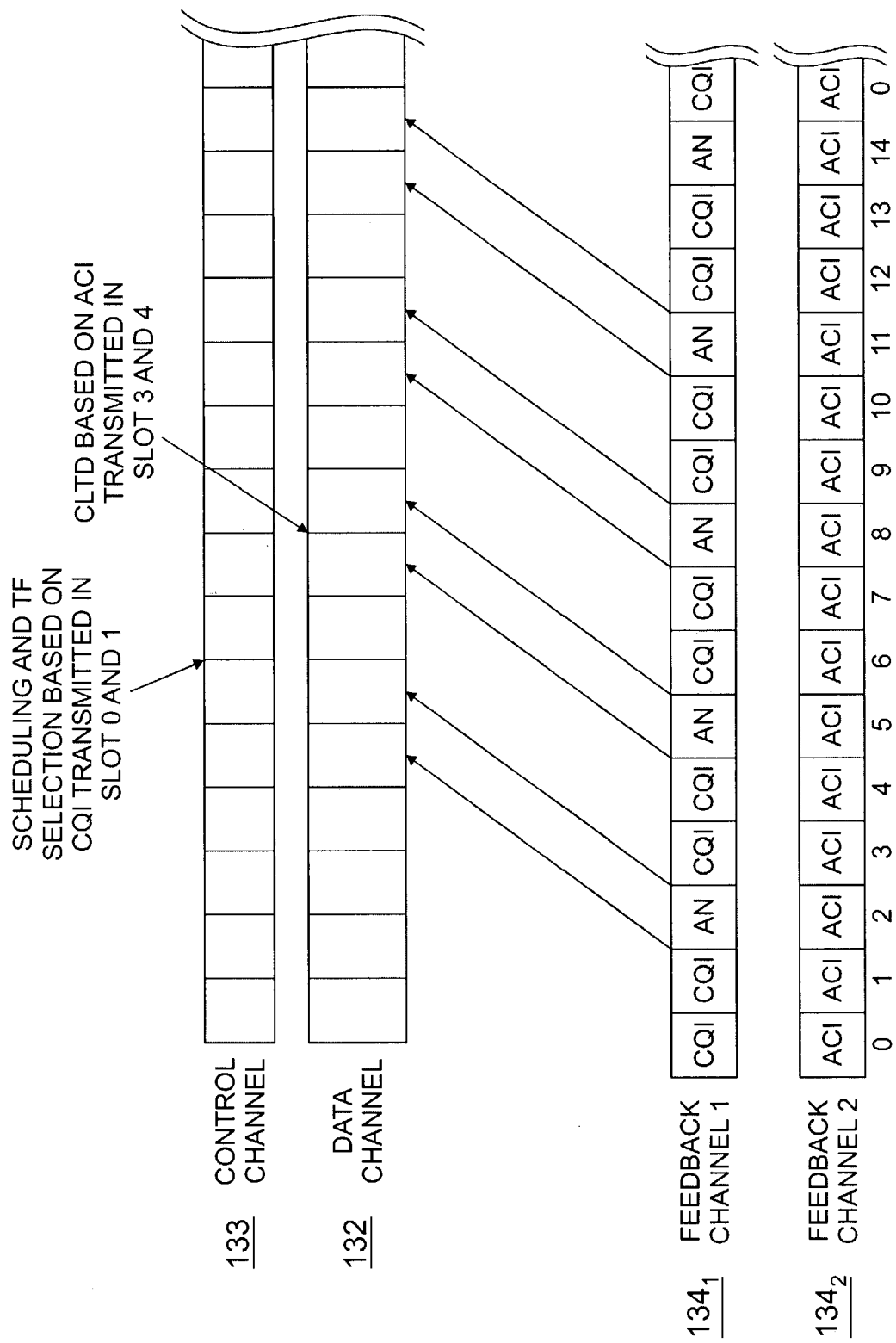
FIG. 6 shows another exemplary data exchange session in accordance with aspects of the present invention.

As an alternative to interleaving CQI and ACI on the same control channel, for some embodiments, CQI and ACI may be transmitted from the mobile station 120 to the base station 110 using separate feedback channels. For example, as illustrated in FIG. 6, CQI may be transmitted on a first feedback channel $134_1$, while ACI is transmitted on a second feedback channel $134_2$. As illustrated, the second feedback channel $134_2$ may be dedicated to ACI feedback. The second feedback channel $134_2$ may also use a different spreading (or channelization) code than the first feedback channel $134_1$. Accordingly, transmissions from the two channels are orthogonal and both channels may be decoded at the base station. The frequency of ACI feedback on the second feedback channel $134_2$ may vary (e.g., every TTI, every N TTIs, etc.), and may be controlled through any suitable signaling procedures, such as through the control channel 133.

Regardless, by utilizing two feedback channels $134_1$ and $134_2$, both ACI and CQI may be provided to the base station with minimal delay. Therefore, an advantage to using separate feedback channels $134_1$ and $134_2$ may include a reduced feedback cycle time. Another advantage may be that use of the previously described HSDPA control channel (HS-DPCCH) may be maintained, without modification, for CQI signaling, which may help speed implementation (e.g., by taking advantage of existing hardware, software, etc.).

Of course, for some embodiments, a feedback message may include both ACI and CQI. For example, the feedback information may have N+M bits, with N bits allocated to ACI and M bits allocated to CQI. Of course, using this approach, an increased number of bits would require an additional number of bits to be transmitted to achieve the same number of possible values for each ACI or CQI. For example, to achieve 32 possible values for each ACI and CQI, FBI would require 10 bits (5 for each), rather than the 6 required using the allocation technique described above. However, because the ACI and CQI arrive together, the total feedback cycle time may be reduced. Further, as previously described, the ACI and CQI bits may be encoded and, thus, may be transmitted at a lower transmission power level, which may result in less interference and increased battery life.

Regardless of the number of feedback channels utilized and the format of the feedback message (e.g., FBI values allocated between ACI and CQI, encoded, unencoded, etc.), feedback signaling errors may lead to a base station receiving the wrong feedback information, which may lead to transmissions using wrong antenna weights or transmissions from the wrong antenna, resulting in high error rates at the mobile station.

FEEDBACK ERROR DETECTION/CORRECTION

In an effort to provide a level of robustness (i.e., tolerance to feedback signaling errors), embodiments of the present invention provide for detection of, and possible recovery from, feedback errors. According to aspects of the present invention, the mobile station may determine a set of antenna weights applied at the base station and process a received transmission accordingly, regardless of the antenna control information fed back to the mobile station. While the feedback error detection techniques described below may be utilized in conjunction with the closed loop transmit diversity (CLTD) schemes described above, they are not so limited, and may also be utilized in systems employing any other type CLTD schemes, such as UMTS CLTD modes.

Figure 7:
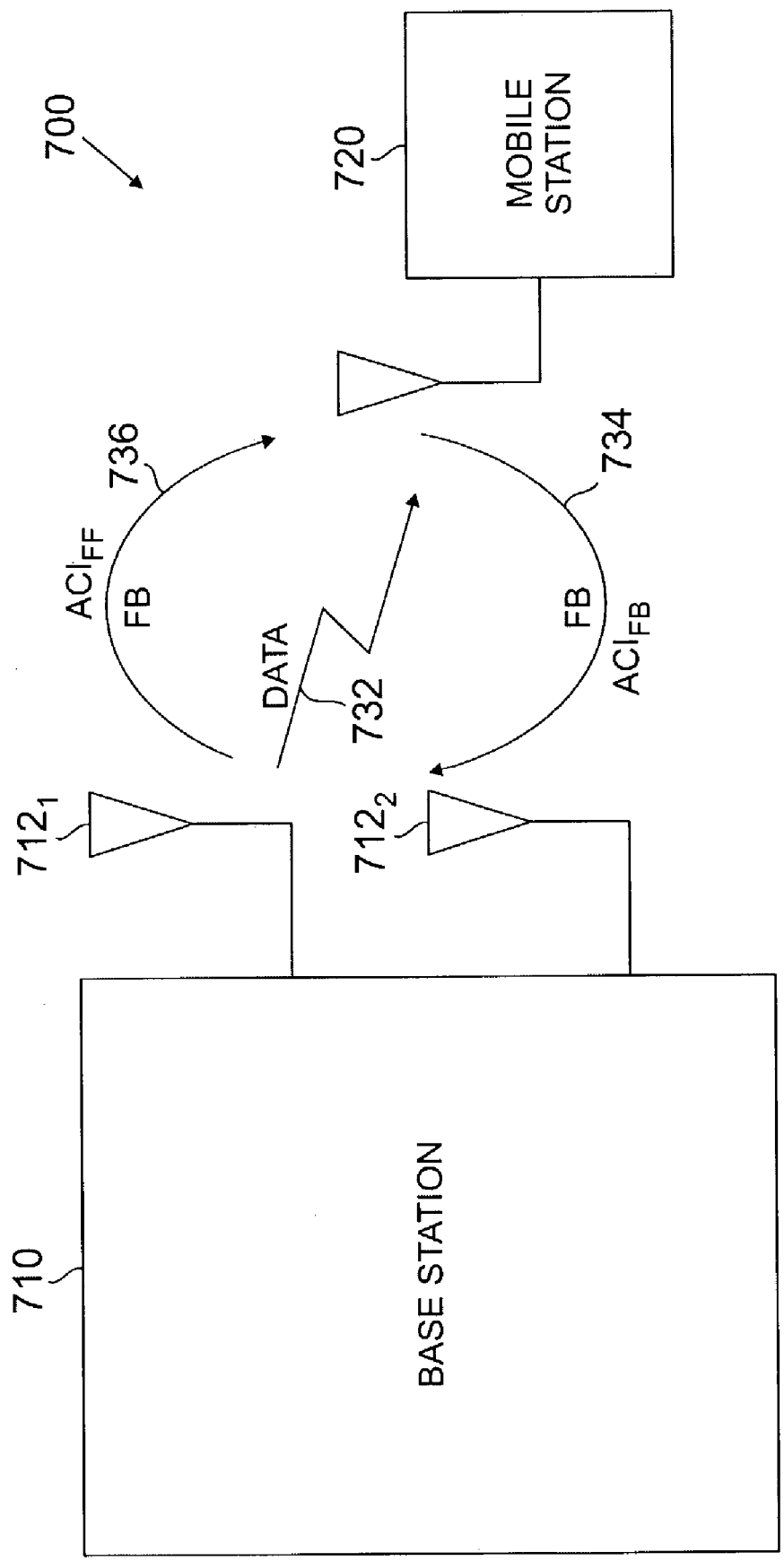
FIG. 7 shows another exemplary wireless communications system including a base station and mobile station in accordance with aspects of the present invention.

FIG. 7 illustrates an exemplary wireless communications system 700 comprising a base station 710 and a mobile station 720 employing feedback error detection, according to one aspect of the present invention. As illustrated, the base station 710 may transmit data to the mobile station 720, via a data channel 732, while the mobile station 720 feeds back antenna control information ($ACI_{FB}$) to the base station 710 via a feedback channel 734 for use in controlling transmissions from one or more base station antennas 712.

If the feedback bits received at the base station 710 are in error, then the wrong weights are applied to the antennas. If the mobile station 720 assumes that the weights being used are indeed the ones that it fed back to the base station 710, then the result will be improper demodulation at the mobile station receiver resulting, almost certainly, in a frame error event at the mobile station 720. Therefore, it is important not only to ensure that the feedback error rate is low but also that, when the wrong weights are applied as a consequence, the mobile station 720 is able to detect that the weights are incorrect. If the mobile station 720 detects that the weights used by the base station 710 are incorrect, it can demodulate the received signal with the weights actually used by the base station 710. The result will be a loss in signal-to-noise ratio (because the calculated antenna weights fed back to the base station 710 were not used), but not as catastrophic as the case when mobile station 720 uses weights for demodulation that are different from the ones used by the base station 710.

To alleviate this problem, in accordance with aspects of the present invention, and in contrast to the prior art, the base station 710 may also send (feed forward) antenna control information ($ACI_{FF}$) to the mobile station, via a feed forward channel 736. The $ACI_{FF}$ may indicate the antenna and weight information the base station 720 used for transmissions in the data channel 732. For some embodiments, the feed forward channel 736 may be an existing channel, such as a UMTS defined control channel (or more specifically, an HSDPA defined control channel) used for downlink signaling.

Figure 8:
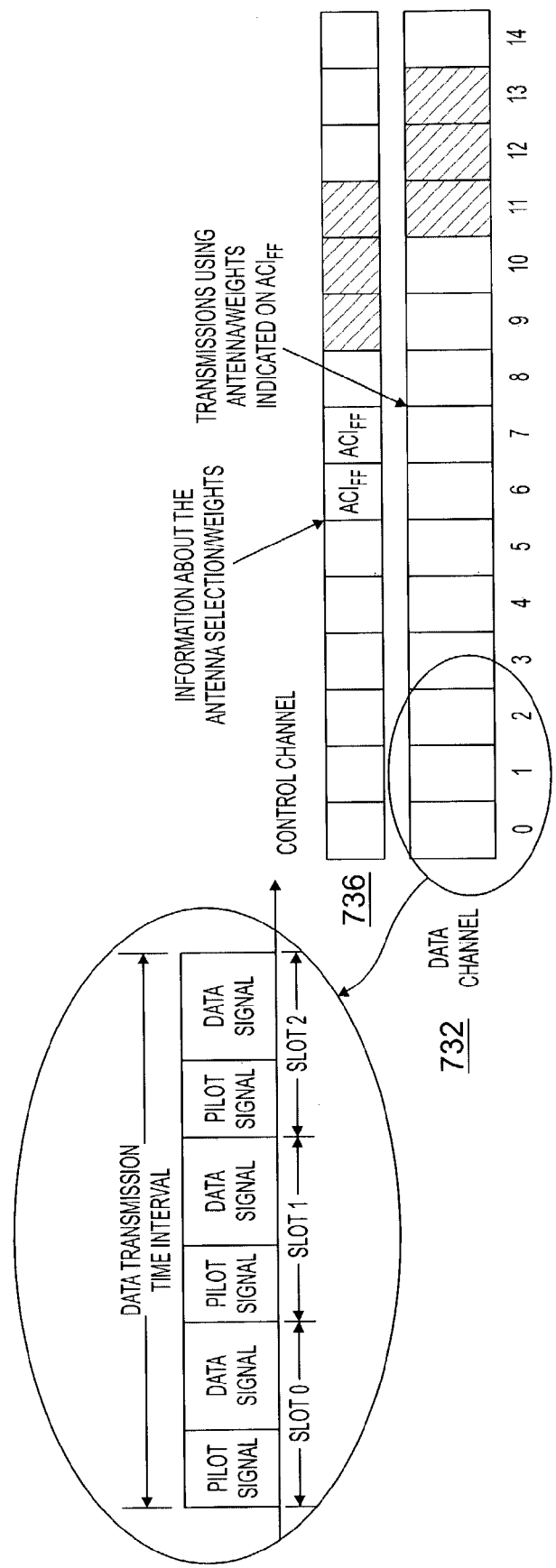
FIG. 8 shows another exemplary data exchange session in accordance with aspects of the present invention.

FIG. 8 illustrates a flow of traffic for an exemplary data session, in accordance with aspects of the present invention, utilizing the feed forward channel 736. As illustrated, $ACI_{FF}$ may be sent on the feed forward control channel 736 prior to sending a transmission on the data channel 732, using antenna weights indicated by the $ACI_{FF}$. Therefore, the mobile station 720 may use $ACI_{FF}$ to verify the antenna control information previously fed back ($ACI_{FB}$) to the base station 710 was received without error and/or whether the base station 710 has used antenna weights specified by the $ACI_{FB}$ for transmissions yet. Accordingly, the $ACI_{FF}$ may allow the mobile station 720 to detect feedback errors or delays in applying antenna weights specified by the $ACI_{FB}$.

Figure 9:
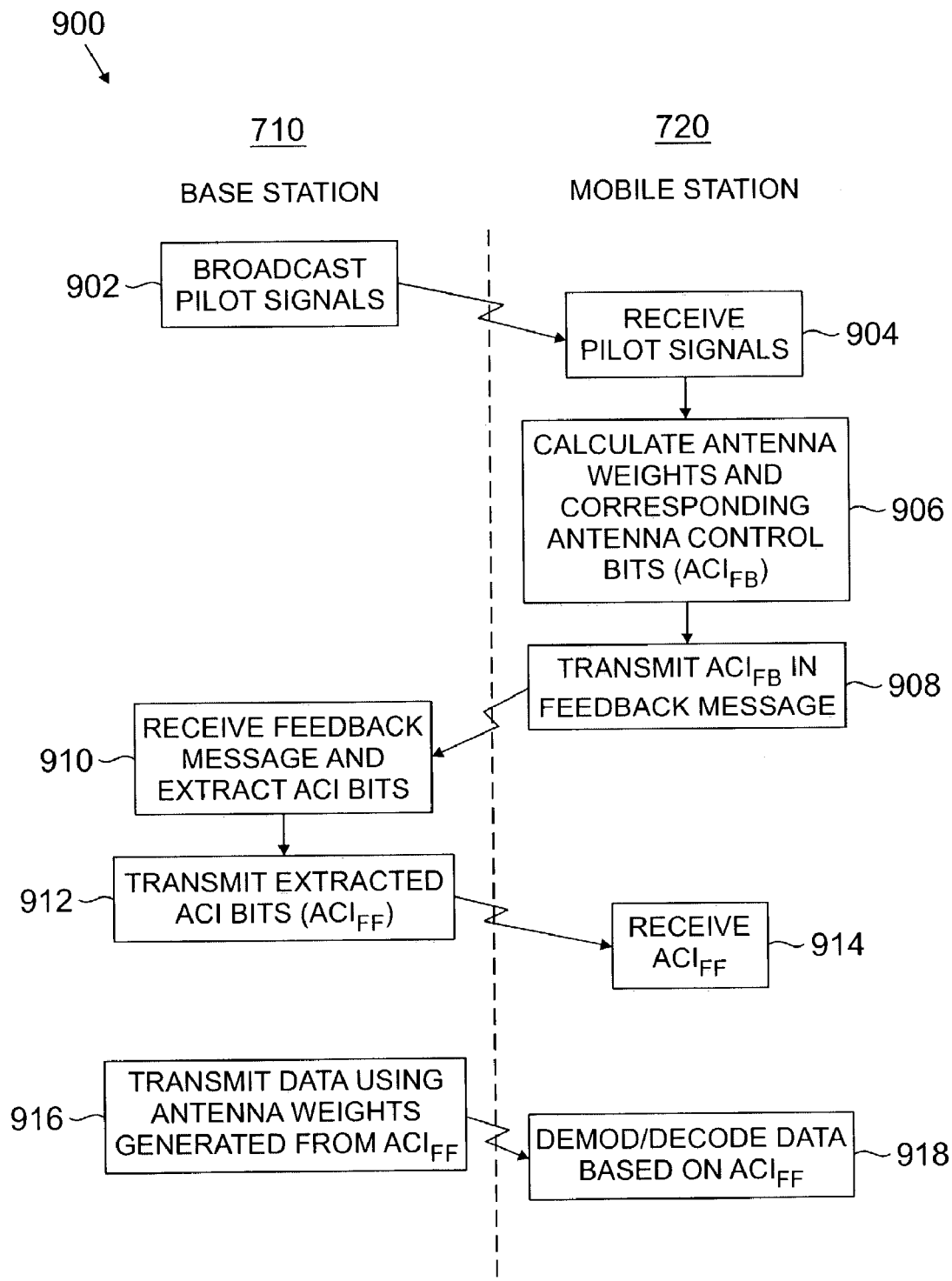
FIG. 9 shows a flow diagram of exemplary operations for feedback error detection that may be performed by the mobile station and base station of FIG. 7.

FIG. 9 illustrates exemplary operations 900 that may be performed by the base station 710 and the mobile station 720 for performing feedback error detection, according to aspects of the present invention. The operations of steps 902–910 may correspond to conventional CLTD operations or to the previously described CLTD operations according to the present invention.

At steps 902 and 904, the base station 710 broadcasts and the mobile station 720 receives, respectively, pilot signals. At step 906, the mobile station 720 calculates antenna weights and corresponding antenna control information bits based on the pilot signals. Typically, the base station 710 continually broadcasts pilot signals from each antenna. The mobile station 720 typically uses these pilot signals to determine the appropriate antenna weights. At step 908, the mobile station transmits a feedback message containing the antenna control information ($ACI_{FB}$) to the base station 710. At step 910, the base stations 710 receives the feedback message (i.e., receives the feedback message with or without errors) and extracts the ACI bits.

At step 912, the base station 710 transmits (feeds forward) antenna control information ($ACI_{FF}$) to the mobile station 720. In other words, the $ACI_{FF}$ may simply be the ACI extracted from the feedback message and "echoed" back to the mobile station 720. As an alternative, the $ACI_{FF}$ may be the ACI used to generate the antenna weights used for the next data transmission. For example, the base station 710 may not have received the latest ACI fed back from the mobile station 720 in time for application to the next data transmission. Therefore, the $ACI_{FF}$ may provide an indication of the antenna weights used for a subsequent transmission. Regardless, at step 914, the mobile station 720 receives $ACI_{FF}$.

At step 916, the base station 710 transmits data to the mobile station 720 using antenna weights generated using the $ACI_{FF}$. At step 918, the mobile station 720 receives the data, and processes (e.g., demodulates, decodes, etc.) the data based on the $ACI_{FF}$, rather than the $ACI_{FB}$. For some embodiments, the mobile station 720 may also compare $ACI_{FB}$ to $ACI_{FF}$ to verify the base station 710 received the $ACI_{FB}$, for example, to detect or record feedback errors for control purposes. For example, in response to detecting a high error rate on a feedback channel (as indicated by mismatches between $ACI_{FB}$ to $ACI_{FF}$), the mobile station may request a new feedback channel.

For some embodiments, the mobile station 720 may perform feedback error detection/correction even if the base station 710 does not feed forward antenna control information. For example, the mobile station 720 may estimate the antenna weights used by the base station from a dedicated antenna pilot channel received with a transmission. (Referring back to FIG. 8, data is typically transmitted in a time slot preceded by a pilot signal).

In the absence of a feed-forward mechanism, the mobile station 720 needs to use signals received from common pilot channels of the two antennas and dedicated pilot channels of the two antennas. The common pilot channels do not use any weights, but the dedicated pilot channels use the same antenna weights as the data to be transmitted to the user. By correlating the common pilot channel signal with the dedicated pilot channel signal from the antennas, the weights applied can be inferred (of course, this process is not completely error free). When the set of possible weights is large, inferring the antenna weights used at the base station 710 is a complex task. Thus, the use of a feed-forward mechanism greatly simplifies verification of the weights used. However, in the absence of the feed-forward mechanism, the inferred weights may still be used to correct feedback errors.

Figure 10:
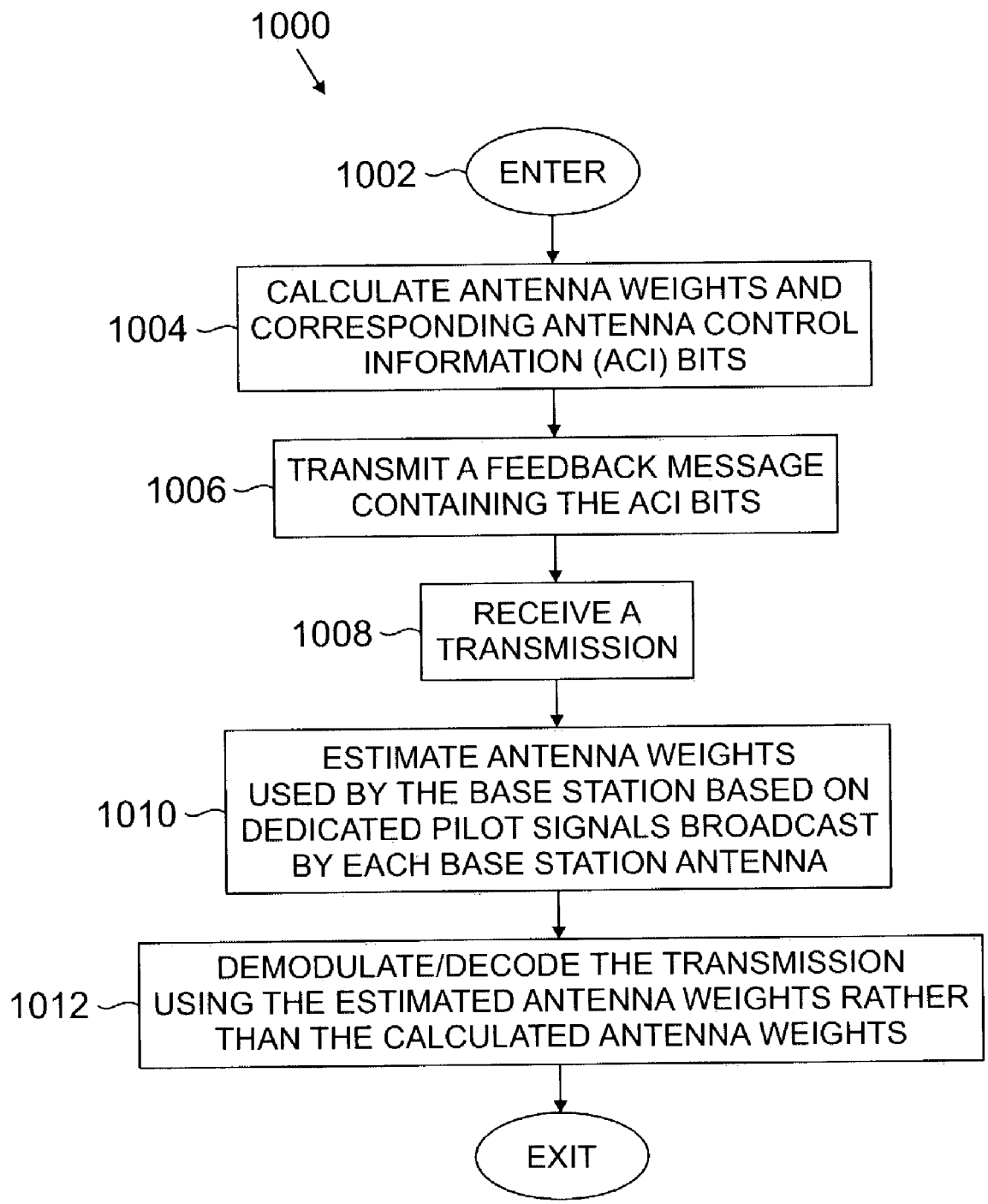
FIG. 10 shows a flow diagram of exemplary operations for feedback error detection that may be performed by the mobile station of FIG. 7.

FIG. 10 illustrates exemplary operations 1000 for correcting feedback errors that may be performed by the mobile station 720 in the absence of a feed forward ACI from the base station 710. The operations begin at step 1002, for example, after receiving a transmission from the base station 710.

At step 1004, the mobile station calculates antenna weights and corresponding antenna control information (ACI) bits. At step 1006, the mobile station 720 transmits a feedback message containing the $ACI_{FB}$ bits to the base station 710. At step 1008, the mobile station receives a transmission with a dedicated pilot signal from the base station. Because there is no feed forward information regarding the antenna weights applied at the base station for the transmission, there is no explicit way for the mobile station 720 to determine if a feedback signaling error has occurred.

Therefore, at step 1010, the mobile station 720 estimates the antenna weights used by the base station 710 based on the dedicated pilot signals. At step 1012, the mobile station 720 demodulates/decodes the transmission using the estimated antenna weights rather than the calculated antenna weights. Accordingly, the mobile station 720 may properly process the transmission even if a feedback signaling error has occurred.

Of course, although the mobile station 720 may not use the previously calculated antenna weights (fed back to the base station 710) to process the transmission, it is still desirable to calculate the weights and feed the antenna control information back to the base station 710 in an effort to optimize the received signal strength. Further, as previously described, estimating antenna weights from the pilot signal may also provide an indication of whether antenna weights corresponding to feedback ACI have yet been applied by the base station, thus possibly overcoming feedback delays.

Figure 11:
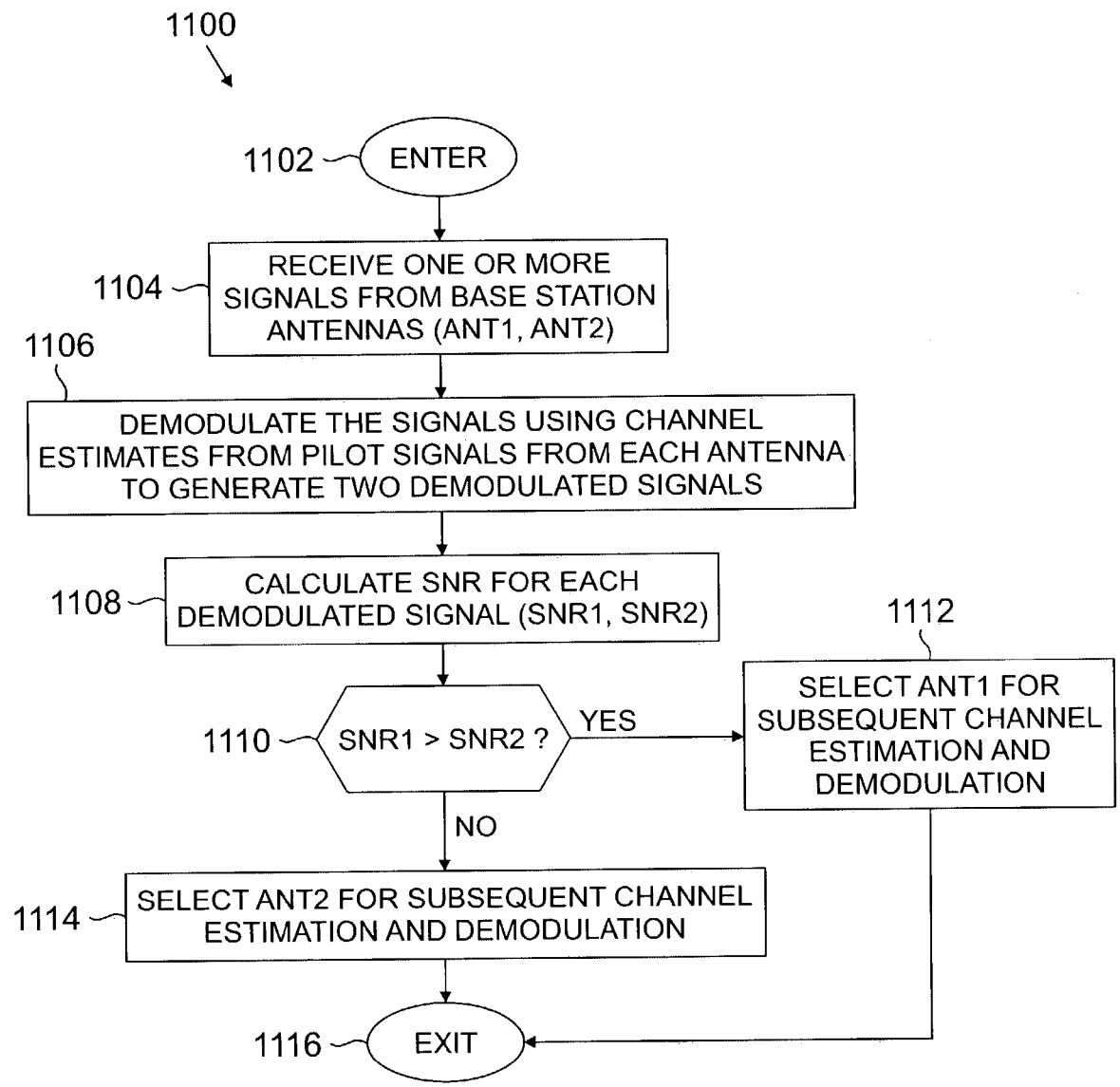
FIG. 11 shows another flow diagram of exemplary operations for feedback error detection that may be performed by the mobile station of FIG. 7.

FIG. 11 illustrates another technique that may be used to detect feedback errors in systems utilizing selection transmit diversity (STD). Rather than simply demodulate/decode a received transmission using a selected antenna that was requested in a feedback message, the mobile station demodulates/decodes the received transmission multiple times: as if it came from ANT1 and as if it came from ANT2. The antenna corresponding to a demodulated transmission with the highest signal to noise ratio (SNR) is selected for future decoding/demodulating. The method begins at step 1102, for example, after requesting the base station transmit from a particular antenna in an STD feedback message.

At step 1104, the mobile station 720 receives a transmission from the base station 710 having one or more antennas (e.g., ANT1 and ANT2), each antenna broadcasting one or more pilot signals. At step 1106, the mobile station 720 demodulates/decodes the transmission using separate channel estimates generated based on each pilot signal to generate two separate demodulated signals. As previously described, each antenna may broadcast common and dedicated pilot signals. The common or dedicated pilot signals received from the base station can be appropriately filtered to determine the channel estimates to be used for demodulation.

At step 1108, the mobile station 720 calculates a signal to noise ratio (SNR) for each of the demodulated signals (e.g., SNR1 and SNR2). At step 1110, the mobile station 720 compares the two calculated SNRs. If SNR1>SNR2, the mobile station 720 assumes the base station 710 transmitted the signal using ANT1, and the mobile station 720 selects ANT1 for channel estimation and demodulation of subsequent transmissions, at step 1112. On the other hand, if SNR2>SNR1, the mobile station 720 assumes the base station transmitted the signal using ANT2, and the mobile station 720 selects ANT2 for channel estimation and demodulation of subsequent transmissions, at step 1114. At step 1116, the operations 1100 are terminated, for example, by returning the selected antenna to a main control routine.

According to the operations 1100, the antenna corresponding to a pilot signal used for a channel estimate resulting in a demodulated signal with the greatest SNR is selected for subsequent channel estimation and demodulation, regardless of which antenna was selected in a previously fed back ACI. Of course, the operations 1100 may be easily modified to accommodate a base station 710 with more than two antennas. Of course, the operations 1100 may be repeated as necessary, for example, following transmission of each STD feedback message from the mobile station 720 to the base station 710.

Figure 12:
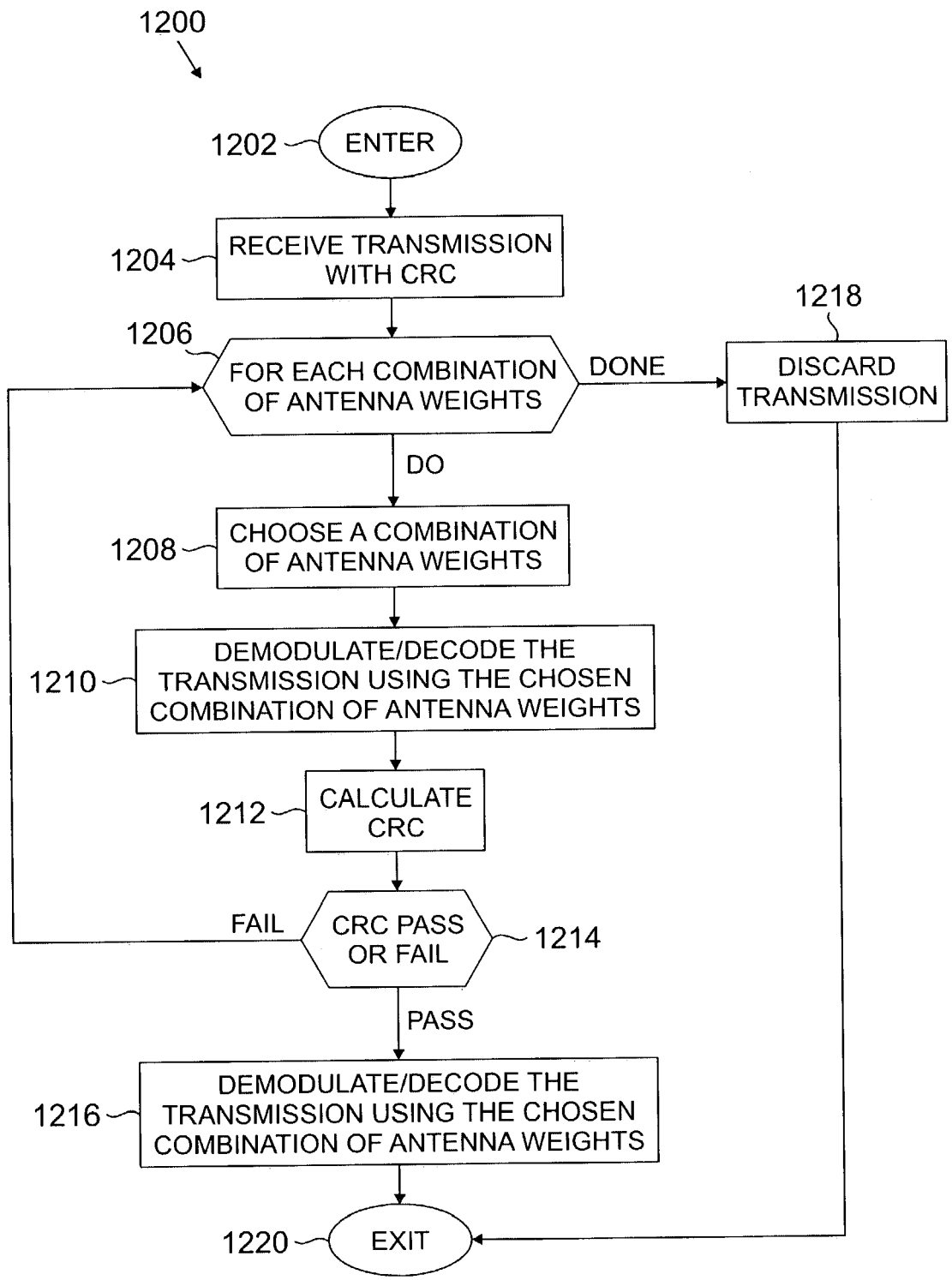
FIG. 12 shows still another flow diagram of exemplary operations for feedback error detection that may be performed by the mobile station of FIG. 7.

Often, certain types of transmissions are sent with an error checking value, such as a cyclic redundancy check (CRC). Therefore, as an alternative to calculating SNR as a means to gather information regarding transmissions from the base station 710, the mobile station 720 may calculate a CRC for a set of signals generated by demodulating a received transmission using different combinations of antenna weights. FIG. 12 illustrates exemplary operations 1200 that may be performed by the mobile station 720 for gathering information regarding transmissions from the base station 710 based on calculated CRCs.

The exemplary operations 1200 may be used to detect/correct feedback errors in systems utilizing any type of CLTD. In other words, the illustrated technique may be used to detect/correct errors in feeding back antenna control information including antenna selections or antenna weight information (e.g., phase and/or power control information). The description below refers to a cyclic redundancy check (CRC), as just one example of an error detection value and the operations 1200 may be easily modified to accommodate any other type of error correction value (e.g., other types of checksums, parity bits, etc.).

The operations 1200 begin at 1202, for example, after feeding back antenna control information (ACI) to a base station. At step 1204, the mobile station 720 receives a transmission including a CRC. As indicated by for-block 1206, steps 1208–1214 represent a loop of operations that may be performed for each combination of antenna weights (e.g., each combination of antenna control bits, whether they be antenna selection bits, phase/power bits, etc.).

At step 1208, a combination of antenna weights is chosen and, at step 1210, the received transmission is demodulated/decoded using the chosen combination of antenna weights. At step 1212, the mobile station 720 calculates a CRC for the demodulated/decoded transmission. At step 1214, the calculated CRC is checked to see if it has passed or failed (e.g., if the calculated CRC matches the received CRC).

If the CRC passes this indicates that the presently chosen combination of antenna weights were applied at the base station when sending the transmission. Therefore, if the CRC passes, the loop (steps 1208–1214) is exited, the chosen combination of antenna weights is selected for demodulating/decoding subsequent transmissions, at step 1216, and the operations are terminated, at step 1220, for example, by returning the selected combination of antenna weights to a main control routine.

If the CRCs do not match, processing returns to the for-block 1206, and a new combination of antenna weights is chosen, at step 1208. If the operations 1208–1214 are performed for each combination of antenna weights without a match between CRCs, an error likely occurred (in transmission or reception of the feedback message). Accordingly, processing proceeds to step 1218, where the transmission is discarded, prior to terminating the operations, at step 1220 and, for example, returning an error code (e.g., a flag indicating a feedback signaling error has been detected) to a main control routine.

The mobile station 720 may choose to traverse the possible combinations of antenna weights (within the loop of the for-block 1206) in any order, according to any suitable method. For example, the mobile station 720 may simply start with the combination of antenna weights corresponding to a lowest value of ACI bits (e.g., all 0s) and proceed in order to the highest value (e.g., all 1s).

As an alternative, the mobile station 720 may employ a "historical" approach, for example, by first choosing a combination of antenna weights corresponding to the most recently fed back ACI, then a combination of antenna weights corresponding to the second most recently fed back ACI, etc. In other words, in the absence of a feedback signaling error, the base station should have used recently fed back ACI for generating antenna weights used for the received transmission. Therefore, this historical approach may result in choosing the correct combination of antenna weights with reduced processing time. On the other hand, for some embodiments, some of the operations 1200 may be performed in parallel (e.g., the decoding/demodulation and comparisons of steps 1210 and 1212), so processing time may not be an issue.

Although various embodiments that incorporate the teachings of the present invention have been shown and described in detail herein, those skilled in the art can readily devise many other varied embodiments that still incorporate these teachings.

We claim:

1. A method for use in a mobile station, comprising the steps of:
   generating first antenna control information for use at a base station based on one or more first signals received from the base station, the first antenna control information adapted for selecting one of a plurality of base station antennas to be used for transmitting subsequent signals from the base station to the mobile station;
   transmitting the first antenna control information to the base station;
   receiving second antenna control information and subsequent signals from the base station;
   determining, using the second antenna control information, which of the base station antennas was used for transmitting the subsequent signals, by:
      generating a set of comparison signals, each comparison signal generated by processing the subsequent signals, using the second antenna control information, as if the subsequent signals were transmitted from a corresponding one of the base station antennas;
      calculating a quality value for each of the comparison signals; and
      determining the selected one of the plurality of antennas using the quality values; and
   processing the subsequent signals received from the base station as if the subsequent signals were transmitted using the determined base station antenna.

2. The method of claim 1, further comprising the step of comparing the first antenna control information to a portion of the second antenna control information from the base station to detect a feedback signaling error.

3. The method of claim 1, wherein said step of generating comprises generating antenna weights to be applied to the subsequent signals transmitted from the base station.

4. The method of claim 3, wherein the first antenna control information comprises a set of bits for use in generating the antenna weights at the base station.

5. The method of claim 4, wherein the set of bits comprises at least two bits for phase control and at least two bits for relative transmit amplitude control.

6. A method for use in a base station having a plurality of antennas, comprising the steps of:
  receiving first antenna control information from a mobile station;
  selecting, using the first antenna control information, one of the plurality of antennas to be used for transmitting subsequent signals from the base station to the mobile station;
  transmitting second antenna control information to the mobile station, the second antenna control information adapted for use by the mobile station in determining the selected one of the plurality of antennas to be used by the base station for transmitting the subsequent signals, wherein determining the selected one of the plurality of antennas comprises:
    generating a set of comparison signals, each comparison signal generated by processing the subsequent signals, using the second antenna control information, as if the subsequent signals were transmitted from a corresponding one of the base station antennas;
    calculating a quality value for each of the comparison signals; and
    determining the selected one of the plurality of antennas using the quality values; and
  transmitting the subsequent signals to the mobile station in accordance with the second antenna control information.

7. The method of claim 6, wherein said step of transmitting one or more signals to the mobile station in accordance with the second antenna control information comprises the steps of:
  generating a set of antenna weights based on the second antenna control information; and
  applying the antenna weights to the subsequent signals.

8. The method of claim 6, wherein said step of transmitting the subsequent signals to the mobile station in accordance with second antenna control information comprises transmitting the subsequent signals from the selected one of the plurality of antennas specified by a portion of the second antenna control information.

9. A method for use in a mobile station, comprising the steps of:
  generating antenna weights for use at a base station;
  transmitting antenna control information indicative of the generated antenna weights to the base station;
  receiving one or more signals from the base station;
  estimating, based on the one or more signals, antenna weights applied at the base station in transmitting the one or more signals, by:
    generating a set of comparison signals, each comparison signal generated by processing the one or more signals as if the one or more signals were transmitted from a corresponding one of the base station antennas;
    calculating a signal to noise ratio for each of the comparison signals; and
    estimating, for each of the comparison signals, an antenna weight using the signal to noise ratios; and
  processing subsequent signals according to the estimated antenna weights.

10. The method of claim 9, further comprising the step of comparing the estimated antenna weights to the generated antenna weights to detect a feedback signaling error.

11. A method for use in a mobile station, comprising the steps of:
  selecting one of a plurality of antennas for use in transmitting signals from a base station;
  transmitting antenna control information indicative of the selected antenna to the base station;
  receiving one or more control signals and subsequent signals from the base station;
  determining which of the base station antennas was used for transmitting the subsequent signals from the base station by:
    generating a set of processed signals, each processed signal generated by processing the subsequent signals, using the one or more control signals, as if the subsequent signals were transmitted from a corresponding one of the base station antennas;
    calculating a quality value for each of the processed signals; and
    determining, using the quality values, the base station antenna used for transmitting the subsequent signals; and
  processing the subsequent signals from the base station as if the subsequent signals were transmitted using the determined base station antenna.

12. The method of claim 11, wherein said steps of calculating the quality value for each of the processed signals and determining the base station antenna comprise to steps of:
  calculating the quality value for each of the processed signals, wherein the quality value comprises a signal to noise ratio for each of the processed signals; and
  determining the base station antenna used for transmitting the subsequent signals as the base station antenna corresponding to the processed signal with the highest calculated signal to noise ratio.

13. The method of claim 11, wherein said step of selecting comprises the step of performing channel estimation based on a pilot signal broadcast by the determined base station antenna.

14. The method of claim 11, wherein said steps of calculating the quality value for each of the processed signals and determining the base station antenna comprise the steps of:
  calculating the quality value for each of the processed signals, wherein the quality value comprises an error detection value for each processed signal; and
  determining the base station antenna used for transmitting the subsequent signals as the base station antenna corresponding to the processed signal for which a calculated error detection value matches an error detection value included with the one or more signals.

15. A method for use in a mobile station, comprising the steps of:
  receiving one or more signals from a base station;
  determining a set of antenna weights applied at the base station in transmitting the one or more signals, wherein determining the set of antenna weights comprises:

generating a set of processed signals, each processed signal generated by processing the one or more signals as if the one or more signals were transmitted using a corresponding one of the antenna weights;

calculating a quality value for each of the processed signals; and determining, using the quality values, the set of antenna weights used for transmitting the one or more signals; and processing the one or more signals according to the determined set of antenna weights.

16. The method of claim 15, wherein said steps of calculating the quality value for each of the processed signals and determining the set of antenna weights comprise:

calculating the quality value for each of the processed signals, wherein the quality value for each of the processed signals comprises an error detection value; and determining the set of antenna weights used for transmitting the one or more signals as the set of antenna weights corresponding to a processed signal for which the calculated error detection value matches an error detection value included with the one or more signals.

17. The method of claim 15, wherein:

each set of antenna weights is represented as antenna control information comprising a field having a range of values, each value corresponding to a different set of antenna weights; and each processed signal is generated by processing the one or more signals according to the set of antenna weights corresponding to a value of the antenna control information field.

18. The method of claim 15, wherein said step of calculating the quality value for each of the processed signals comprises calculating a signal to noise ratio for each of the processed signals.

19. The method of claim 15, further comprising the steps of:

transmitting to the base station, prior to said step of receiving one or more signals from the base station, antenna control information indicative of a set of generated antenna weights to be applied at the base station; and comparing the determined set of antenna weights to the generated antenna weights to verify the base station properly received the antenna control information transmitted to the base station.

20. A mobile station, comprising:

means for generating antenna weights to be applied at a base station having a plurality of antennas;

means for transmitting antenna control information indicative of the generated antenna weights to the base station;

means for determining, based on one or more signals received from the base station, antenna weights applied at the base station in transmitting the one or more signals, wherein the means for determining antenna weights applied at the base station comprises:

means for generating a set of processed signals, each processed signal generated by processing the one or more signals as if the one or more signals were transmitted using a corresponding one of the antenna weights;

means for calculating a quality value for each of the processed signals; and means for determining, using the quality value, the antenna weights used for transmitting the one or more signals; and means for processing the one or more signals or subsequent signals as if transmitted from the base station using the determined antenna weights.

21. The mobile station of claim 20, further comprising means for comparing the generated antenna weights to the determined antenna weights to verify the base station properly received the antenna control information.

22. The mobile station of claim 20, wherein the one or more signals comprise a feed forward message containing antenna control information indicative of the antenna weights applied at the base station.

23. The mobile station of claim 20, wherein the quality values comprise signal to noise ratios calculated for the set of processed signals.

24. The mobile station of claim 20, wherein the quality values comprise error detection values calculated for the set of processed signals, wherein the means for determining is configured to determine the antenna weights based on the error detection values calculated for the set of processed signals and an error detection value transmitted within the one or more signals.

25. A base station, comprising:

a plurality of antennas;

means for receiving, from a mobile station, a feedback message including first antenna control information indicative of antenna weights to be used for transmissions from the plurality of antennas;

means for selecting, using the first antenna control information, one of the plurality of antennas to be used for transmitting subsequent signals from the base station to the mobile station; and means for transmitting, to the mobile station, a feed forward message including second antenna control information adapted for use by the mobile station in a means for determining the selected one of the plurality of antenna to be used by the base station for transmitting the subsequent signals from the base station to the mobile station, and for transmitting the subsequent signals to the mobile station from the plurality of antennas using the antenna weights indicated by the second antenna control information;

wherein the means for determining the selected one of the plurality of antenna to be used by the base station for transmitting the subsequent signals comprises:

means for generating a set of processed signals, each processed signal generated by processing the second antenna control information as if the subsequent signals were transmitted from a corresponding one of the base station antennas;

means for calculating a quality value for each of the processed signals; and means for determining, using the quality values, the base station antenna used for transmitting the subsequent signals.

26. The base station of claim 25, wherein the base station further comprises means for generating a set of antenna weights based on a set of encoded bits included in the first antenna control information.

27. The base station of claim 25, wherein the second antenna control information indicates the selected one of the plurality of antennas to be used for transmitting the subsequent signals.

* * * * *